(12) United States Patent
Cheng et al.

(10) Patent No.: US 10,820,328 B2
(45) Date of Patent: Oct. 27, 2020

(54) METHOD AND APPARATUS FOR DE-CENTRALIZED SPATIAL REUSE IN WIRELESS COMMUNICATIONS SYSTEMS

(71) Applicant: PERASO TECHNOLOGIES INC., Toronto (CA)

(72) Inventors: Gary Cheng, Unionville (CA); Christopher James Hansen, Los Altos, CA (US); Joseph Andonieh, Aurora (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 114 days.

(21) Appl. No.: 15/627,702

(22) Filed: Jun. 20, 2017

(65) Prior Publication Data

US 2017/0367101 A1 Dec. 21, 2017

Related U.S. Application Data

(60) Provisional application No. 62/352,204, filed on Jun. 20, 2016, provisional application No. 62/417,503, (Continued)

(51) Int. Cl.
*H04W 72/08* (2009.01)
*H04W 72/04* (2009.01)
(Continued)

(52) U.S. Cl.
CPC ............ *H04W 72/082* (2013.01); *H04B 7/04* (2013.01); *H04W 28/16* (2013.01); *H04W 28/18* (2013.01);
(Continued)

(58) Field of Classification Search
CPC .................................................. H04W 72/082
See application file for complete search history.

(56) References Cited

U.S. PATENT DOCUMENTS

| 8,472,968 | B1 * | 6/2013 | Kim ................... | H04W 52/244 370/232 |
| 8,605,615 | B2 * | 12/2013 | Frank .................. | H04W 24/04 370/252 |

(Continued)

FOREIGN PATENT DOCUMENTS

| EP | 2919547 A1 | 9/2015 |
| WO | WO-2014074919 A1 | 5/2014 |

*Primary Examiner* — Andrew Lai
*Assistant Examiner* — Andrew C Lee
(74) *Attorney, Agent, or Firm* — Perry + Currier

(57) ABSTRACT

A method for spatial re-use in a first wireless communications assembly of a first service set, comprising: establishing data transfer communications within the first service set; detecting wireless interference generated by a second wireless communications assembly of a second service set distinct from the first service set; responsive to the detecting, sending a notice of interference indicator to the second wireless communications assembly; receiving a response to the notice of interference indicator from the second wireless communications assembly; based on the response, selecting an interference-reducing corrective action to perform within the first service set; and initiating the selected corrective action within the first service set.

16 Claims, 7 Drawing Sheets

Related U.S. Application Data filed on Nov. 4, 2016, provisional application No. 62/445,341, filed on Jan. 12, 2017.

(51) Int. Cl.
| | | |
|---|---|---|
| *H04B 7/04* | (2017.01) | |
| *H04W 28/16* | (2009.01) | |
| *H04W 28/18* | (2009.01) | |
| *H04W 52/34* | (2009.01) | |
| *H04W 74/02* | (2009.01) | |
| *H04W 84/18* | (2009.01) | |

(52) U.S. Cl.
CPC ...... *H04W 72/0426* (2013.01); *H04W 52/346* (2013.01); *H04W 74/02* (2013.01); *H04W 84/18* (2013.01)

(56) References Cited

U.S. PATENT DOCUMENTS

| | | | | |
|---|---|---|---|---|
| 8,838,164 | B2* | 9/2014 | Koo | H04L 1/20 455/501 |
| 9,491,717 | B2* | 11/2016 | Kim | H04W 52/146 |
| 2009/0270109 | A1* | 10/2009 | Wang Helmersson | H04W 72/082 455/453 |
| 2010/0233962 | A1* | 9/2010 | Johansson | H04W 52/343 455/63.1 |
| 2010/0240382 | A1* | 9/2010 | Sampath | H04W 24/02 455/450 |
| 2011/0034192 | A1* | 2/2011 | Lim | H04B 7/0417 455/501 |
| 2011/0312328 | A1* | 12/2011 | Choi | H04W 72/02 455/450 |
| 2012/0033571 | A1* | 2/2012 | Shimezawa | H04B 7/0689 370/252 |
| 2012/0094703 | A1* | 4/2012 | Sasayama | H04W 24/10 455/507 |
| 2012/0315933 | A1* | 12/2012 | Klassen | G06F 16/40 455/466 |
| 2012/0329400 | A1* | 12/2012 | Seo | H04L 5/00 455/63.1 |
| 2013/0142062 | A1* | 6/2013 | Dinan | H04W 24/02 370/252 |
| 2013/0142288 | A1* | 6/2013 | Dinan | H04J 11/0069 375/340 |
| 2013/0142291 | A1* | 6/2013 | Dinan | H04L 5/0053 375/343 |
| 2013/0156009 | A1* | 6/2013 | Dinan | H04W 28/0236 370/332 |
| 2013/0223258 | A1* | 8/2013 | Seo | H04W 52/243 370/252 |
| 2013/0258895 | A1* | 10/2013 | Kim | H04L 5/0055 370/252 |
| 2013/0308473 | A1* | 11/2013 | Sun | H04W 36/30 370/252 |
| 2013/0322277 | A1* | 12/2013 | Vanganuru | H04L 1/20 370/252 |
| 2014/0220985 | A1* | 8/2014 | Lin | H04W 36/20 455/444 |
| 2014/0286203 | A1 | 9/2014 | Jindal et al. | |
| 2014/0293820 | A1* | 10/2014 | Kim | H04W 52/32 370/252 |
| 2014/0370908 | A1* | 12/2014 | Lee | H04W 52/244 455/452.1 |
| 2015/0195057 | A1* | 7/2015 | Tan | H04J 11/0086 370/252 |
| 2015/0208410 | A1* | 7/2015 | Koutsimanis | H04W 72/0426 370/252 |
| 2016/0029239 | A1* | 1/2016 | Sadeghi | H04B 17/345 370/252 |
| 2016/0080963 | A1* | 3/2016 | Marinier | H04W 24/08 370/252 |
| 2016/0112177 | A1* | 4/2016 | Zheng | H04W 72/082 370/330 |
| 2016/0127069 | A1* | 5/2016 | Nuss | H04L 1/1812 370/329 |
| 2016/0157108 | A1* | 6/2016 | Park | H04W 48/16 370/329 |
| 2017/0265204 | A1* | 9/2017 | Paria | H04W 48/20 |
| 2017/0346518 | A1* | 11/2017 | Lim | H04B 1/12 |

\* cited by examiner

500

| 504 Category | 508 Action | 510 Dialog Token | 512 NOI Request |

| 516 Type | 520 Strength | 524 Current AWV | 528 RTS/CTS TRN-R Request | 532 CBAP Request |

| 704 Category | 708 Action | 710 Dialog Token | 712 NOI Response |

| 716 Address | 720 Strength | 724 Current AWV | 728 Corrective Action |

FIG. 7B

METHOD AND APPARATUS FOR DE-CENTRALIZED SPATIAL REUSE IN WIRELESS COMMUNICATIONS SYSTEMS

CROSS-REFERENCE TO RELATED APPLICATIONS

This application claims priority from U.S. provisional patent application Nos. 62/352,204 filed Jun. 20, 2016; 62/417,503 filed Nov. 4, 2016; and 62/445,341 filed Jan. 12, 2017. The contents of each of the above applications is incorporated herein by reference.

FIELD

The specification relates generally to wireless communications, and specifically to a method and apparatus for de-centralized spatial reuse in wireless communications systems.

BACKGROUND

As wireless communications proliferate, the incidence of distinct sets of wireless devices employing the same wireless channels within a physical volume sufficiently small for one such set to interfere with another can be expected to increase. Conventional approaches to reduce such interference, such as contention-based media access rules, may have undesirable impacts on data transfer rates. Such solutions may also require the deployment of a central access point, and therefore may not suitable for systems in which communications are conducted directly between peers.

SUMMARY

An aspect of the specification provides a method for spatial re-use in a first wireless communications assembly of a first service set, comprising: establishing data transfer communications within the first service set; detecting wireless interference generated by a second wireless communications assembly of a second service set distinct from the first service set; responsive to the detecting, sending a notice of interference indicator to the second wireless communications assembly; receiving a response to the notice of interference indicator from the second wireless communications assembly; based on the response, selecting an interference-reducing corrective action to perform within the first service set; and initiating the selected corrective action within the first service set.

BRIEF DESCRIPTIONS OF THE DRAWINGS

Embodiments are described with reference to the following figures, in which:

FIGS. 5A-5B depict example formats for a notice of interference indicator;

FIGS. 7A-7B depict examples formats for a notice of interference response.

DETAILED DESCRIPTION

Figure 1:
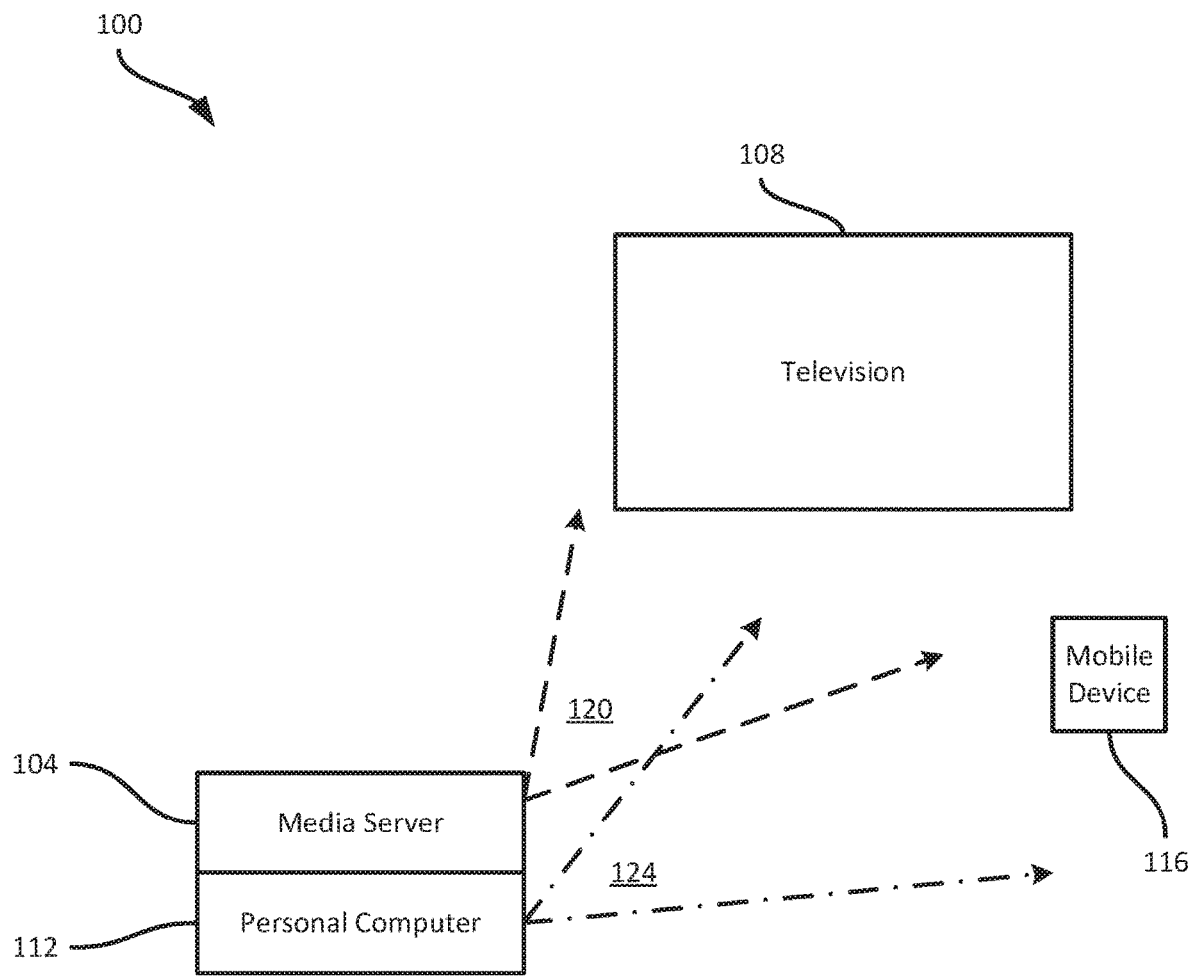
FIG. 1 depicts a wireless communications system.

FIG. 1 depicts a wireless communications system 100, including a plurality of wireless service sets. In particular, FIG. 1 illustrates a first service set containing wireless computing devices 104 and 108, and a second service set containing wireless computing devices 112 and 116. The nature and population of each service set is not particularly limited. As will be apparent to those skilled in the art, each service set may be a personal basic service set (PBSS) consisting of at least a pair of computing devices in communication with each other. In other examples, each service set may be a basic service set (BSS) such as an infrastructure BSS including an access point (not shown) or an independent BSS (not shown).

In the example shown in FIG. 1, the computing device 104 is a media server and the computing device 108 is a television wirelessly receiving media from the device 104 for playback. Further, the computing device 112 is a personal computer and the device 116 is a mobile computing device such as a smartphone, tablet computer or the like, configured to receive data from the computing device 112. A wide variety of other combinations of devices are also contemplated; more generally, each service set includes at least two communication devices, and enables bidirectional communication between those communication devices.

As seen in FIG. 1, the wireless transmissions of the devices of each service set may also reach devices of the other service set. For example, a beam 120 emitted by the computing device 104 permits the device 104 to transmit data to the device 108; however, an edge of the beam 120 also impacts the device 116, which is in a different service set than the device 104. As a further example, a beam 124 emitted by the device 112 permits the device 112 to transmit data to the device 116, but also impacts the device 108. In the present example, both service sets (i.e. all four devices 104, 108, 112, 116) are presumed to be employing the same frequency band to communicate. For example, the devices shown in FIG. 1 all implement the IEEE 802.11ad (WiGig) standard or enhancements thereof (e.g. 802.11 ay), and therefore all transmit and receive data at frequencies around 60 GHz. As a result of the common carrier frequencies employed by the devices and the beam structures shown in FIG. 1, some or all of the devices of the system 100 may receive interference from outside their own service set. For example, the device 108 may receive transmissions from the device 112. Such interference, as will be apparent, may lead to packet loss or other undesirable decreases in wireless data transfer performance. The devices 104, 108, 112 and 116 are therefore configured to perform certain actions to reduce the effects of interference between service sets, for example by initiating spatial re-use or spatial sharing (e.g. the subdivision of the physical space through which transmissions travel between the respective devices).

Figure 2:
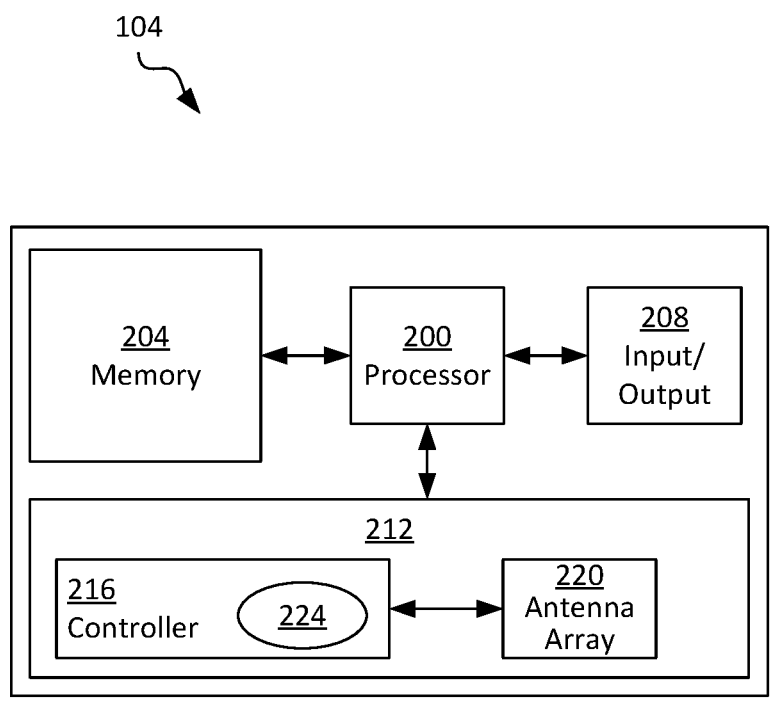
FIG. 2 depicts certain internal components of a wireless communications assembly in the system of FIG. 1.

Turning now to FIG. 2, before describing the operation of the devices of the system 100 to implement the interference-reducing actions mentioned above, certain components of the computing device 104 will be described. The description of the device 104 below also applies to the devices 108, 112 and 116. That is, the devices 108, 112 and 116 also each include the components discussed below, though it will be understood that the particular implementation of each component may vary from device to device.

The device 104 includes a central processing unit (CPU), also referred to as a processor 200. The processor 200 is interconnected with a non-transitory computer readable storage medium, such as a memory 204, having stored thereon various computer readable instructions for performing various actions (e.g. streaming media to the device 108). The memory 200 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes one or more input devices, and one or more output devices, generally indicated as an input/output device 208. The input and output devices 208 serve to receive commands for controlling the operation of the device 104 and for presenting information, e.g. to a user of the device 104. The input and output devices 208 therefore include any suitable combination of devices, including a keyboard, a mouse, a display, a touchscreen, a speaker, a microphone, and the like).

The device 104 further includes a wireless communications assembly 212 interconnected with the processor 200. The assembly 212 enables the device 104 to communicate with other computing devices. In the present example, the assembly 212 enables such communication according to the IEEE 802.11ad standard, and thus transmits and receives data at frequencies of around 60 GHz.

The communications assembly 212 includes a controller 216 in the form of one or more integrated circuits, configured to establish and maintain communications links with other devices. The controller 216 is also configured to process outgoing data for transmission via an antenna array 220 (e.g. a phased array of antenna elements) and to receive incoming transmissions from the array 220 and process the transmissions for communication to the processor 200. The controller 216, in the present example, therefore includes a baseband processor and a transceiver (also referred to as a radio processor), which may be implemented as distinct hardware elements or integrated on a single circuit.

Further, the controller 216 is configured to execute various computer-readable instructions (e.g. stored in a memory element integrated with the controller 216 or implemented as a discrete hardware component of the assembly 212 and connected with the controller 216) for performing the above functions. Further, the controller 216 is configured to execute a spatial re-use application 224, also referred to herein as the application 224. Via the execution of the application 224, the controller 216 is configured to operate the wireless communications assembly 212 to detect and attempt to reduce interference from the computing devices of other service sets than the set of which the device 104 itself is a member.

Figure 3:
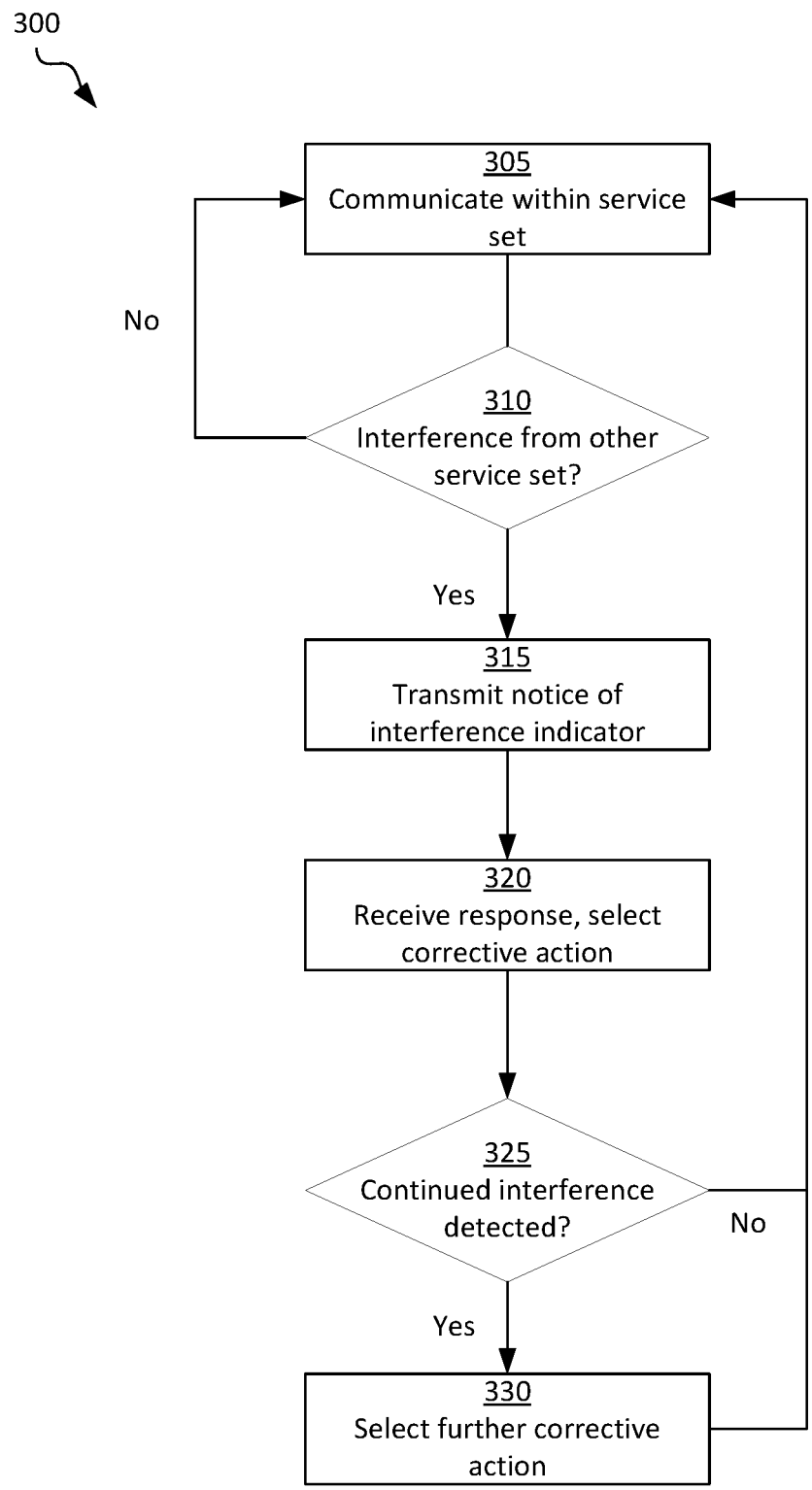
FIG. 3 depicts a method of spatial re-use in the system of FIG. 1.

Turning now to FIG. 3, a method 300 of spatial re-use is illustrated. The performance of the method 300 will be discussed in conjunction with its performance within the system 100, and particularly by the wireless communications assembly 212. Beginning at block 305, the wireless communications assembly 212 is configured to establish data transfer communications within a first service set. Thus, in the example illustrated in FIG. 1, the assembly 212 is configured to establish a wireless communications link with a similar wireless communications assembly of the device 108. The link may be employed, for example, to stream media data from the device 104 to the device 108 for display thereon.

Figure 4:
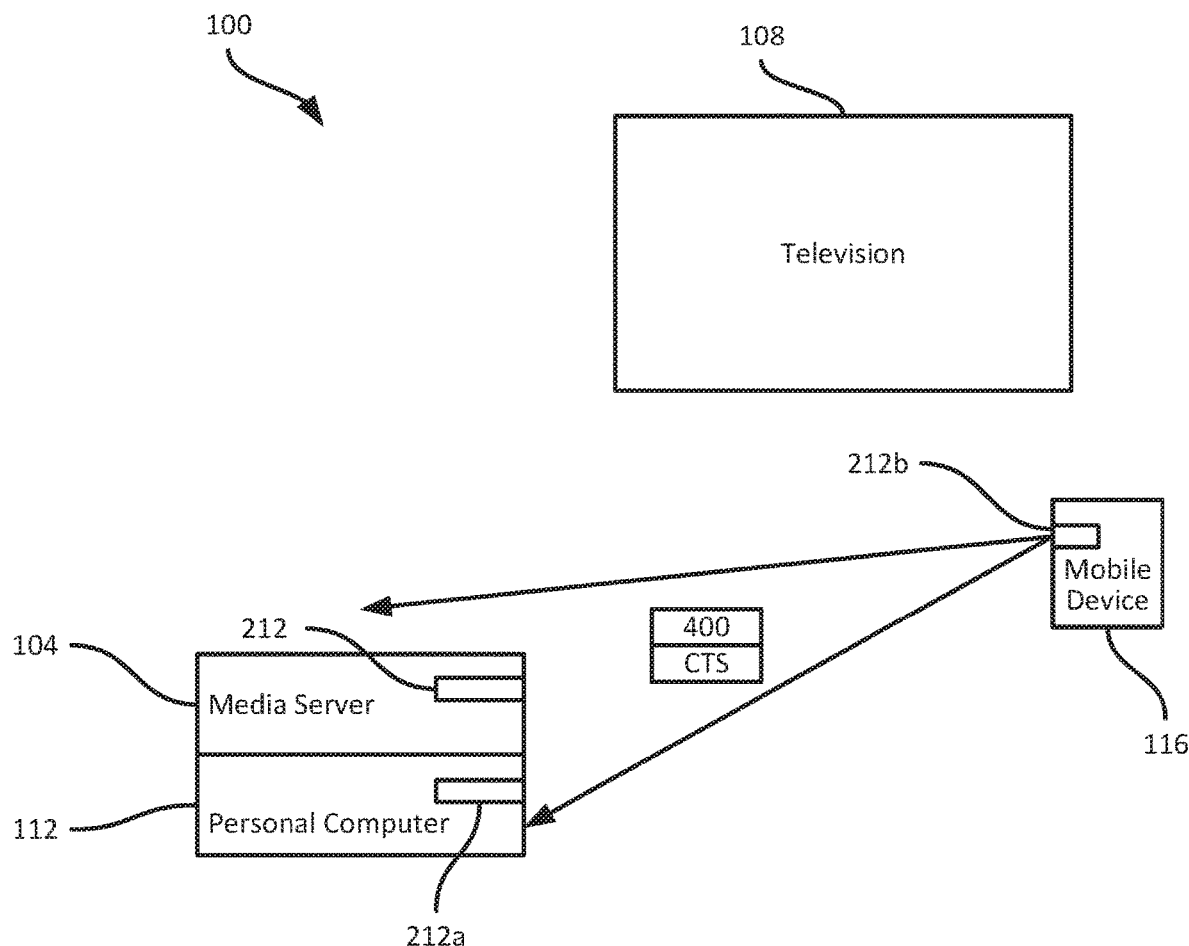
FIG. 4 depicts an interfering transmission in the system of FIG. 1.

At block 310, the assembly 212 is configured to determine whether any interference can be detected from a wireless communications assembly from another service set. That is, at block 310 the assembly 212 determines whether interference is present that originates at a device with which communications were not established at block 305. In the example illustrated in FIG. 1, a transmission from the mobile device 116 to the computing device 112 may also be detectable at the communications assembly 212. Turning to FIG. 4, an example of the system 100 is shown in which a clear-to-send (CTS) frame 400 is transmitted from the mobile device 116 to the computing device 112. As will be apparent, the CTS frame 400 may have been transmitted in response to a request-to-send (RTS) frame previously sent by the computing device 112. The CTS frame 400 includes a network identifier of the device 116, such as an Internet Protocol (IP) address, a Media Access Control (MAC) address, or the like.

As shown in FIG. 4, the transmission of the CTS frame 400 is achieved via the emission of a beam from the device 116 (specifically, from the wireless communications assembly 212b of the device 116) which impacts not only the communications assembly 212a of the computing device 112 (the intended recipient of the CTS frame 400), but also the communications assembly 212 of the computing device 104. Upon detecting the CTS frame 400, the assembly 212 is configured to determine whether the device identifier contained in the CTS frame 400 corresponds to a device with which the assembly 212 has established communications (at block 305). In the present example, the determination is negative, and the CTS frame 400 is therefore classified as interference by the assembly 212.

A variety of other transmissions received at the assembly 212 can also be classified as interference. For example, the assembly 212 may receive an RTS frame and extract therefrom either or both of a sender network identifier and a receiver network identifier, and determine whether communications have been established with either identified device. In a further example, the assembly 212 receives a beacon containing a service set identifier (SSID), and is configured to determine at block 310 whether the SSID corresponds to the service set that the device 104 itself is a member in. In further examples, data frames (e.g. containing media or other data), acknowledgement (ACK) frames, or both, are received at the assembly 212, which is configured to determine whether the frames are addressed to a device with which the assembly 212 has established communications (e.g. specific device identifiers or SSIDs). In further examples, at block 310 the assembly 212 is configured to determine a packet loss count, for example over a predefined time period. If the number or percentage of packets lost during communications exceeds a preconfigured threshold (e.g. 10%), the assembly 212 determines that interference is present. The assembly 212 is also configured, in some examples, to measure the signal strength as an RSSI value or a dBm measurement, and to compare the measured signal strength to a predefine threshold stored in the assembly 212. Thus, even if interference is detected at block 310, in some examples the assembly 212 may not act on the interference (i.e. may not proceed to block 315) unless the signal strength of the interference exceeds a predefined threshold.

As seen in FIG. 3, when the determination at block 310 is negative (i.e. when no interference is detected), no further action is required and the assembly 212 continues communicating within its service set as desired at block 305.

Following an affirmative determination at block 310, the performance of the method 300 proceeds instead to block 315.

At block 315, the assembly 212 is configured to transmit a notice of interference (NOI) indicator to the wireless communications assembly from which the interference detected at block 310 was received. Thus, in the example shown in FIG. 4, the NOI indicator is transmitted from the assembly 212 to the device 116 (more specifically, to the wireless communications assembly 212b of the device 116). The notice of interference indicator can take a variety of forms. In the present example, the assembly 212 is configured to generate and send the NOI indicator as an NOI frame addressed to the source of the interference detected at block 310. The NOI indicator contains at least an indication to the source that interference originating at the source has been detected. In some examples, the NOI indicator contains additional information to be employed by the source in responding to the NOI indicator.

Turning to FIG. 5A, an example NOI frame 500 is illustrated. The NOI frame 500, in the present example, is formatted as an unprotected DMG action frame, although other suitable frame formats will also occur to those skilled in the art. In addition to one or more addressing fields (not shown) containing a network address corresponding to the device 116 (i.e. the source of the interference), the NOI frame 500 also includes a plurality of fields, which are not necessarily illustrated to scale according to their lengths in bits. The fields include a category field 504, which is populated, for example, according to section 9.4.1.11 of the IEEE 802.11ad standard. The fields also include an action field 508 containing a value indicating the type of action represented by the NOI frame 500. As will be apparent to those skilled in the art, certain values for the field 508 are specified in the 802.11ad standard (e.g. the value 0 corresponds to an "Announce" action and the value 1 corresponds to a beam refinement procedure (BRP) action). In the present example, the NOI frame 500 contains a value (e.g. the value 2) in the field 508 that identifies the frame 500 as a notice of interference indication or response.

The frame 500 further includes a dialog token field 510, containing an identifier of the transaction initiated by the sending of the NOI frame 500 and permitting subsequent messages relating to the NOI frame 500 to be correlated with the frame 500. Further, the frame 500 includes an NOI request field 512 containing one or more of the subfields illustrated in FIG. 5B.

In the present example, referring to FIG. 5B, the NOI request field 512 includes an interference type subfield 516, indicating the type of frame detected as interference at block 310. As noted earlier, the type of interference can include any of an RTS or CTS frame, a data frame, and an ACK frame. Other frame types may also be classified as interference in other embodiments, and identified as such in the subfield 516. The field 512 also includes, in the present example, a signal strength measurement subfield 520 of the interference, as measured by the assembly 212 (i.e. the recipient of the interference). The signal strength measurement can be indicated in one or both of an RSSI value (e.g. a value between 0 and 255) and a dBm value. The field 512 can also include an antenna weight vector subfield 524 indicating a set of complex weights currently employed by the assembly 212 to control the reception steering of the antenna array 220.

Further, the field 512 can include a request subfield 528 to append training sequences to subsequent RTS and CTS frames generated by the source of the interference. As will be apparent to those skilled in the art, such training sequences (e.g. Golay sequences) can be contained in TRN-R subfields appended to RTS and CTS frames, and can be employed by the assembly 212 to control the antenna array 220 to steer nulls in the direction of the source of the interference. In addition, the field 512 can include a contention-based access periods (CBAP) request subfield 532, indicating a request to the source of interference to follow a contention-based access protocol in subsequent transmissions. In the present example, the NOI frame 500 is transmitted employing control PHY header and payload encoding, in order to increase the likelihood of receipt by the source of interference.

As will be apparent, the NOI indicator need not be formatted as described above, and when formatted as an action frame as described above, need not include all the fields and subfields noted above. In other examples, the NOI indicator can instead be transmitted according to another suitable frame format. In further examples, the NOI indicator can include a field, subfield, bit, or sequence of bits in an otherwise conventional frame, such as a beacon, a probe request or probe response, and an information request or information response frame. In such examples, the NOI indicator may simply be a bit indicator with a value (e.g. the value 1) indicating that interference has been detected. In further examples, the NOI indicator, including any or all of the subfields described above, can be included with (e.g. appended to) other packets. Still further, the NOI indicator need not be addressed specifically to the source of the interference, such as by the source's MAC address. In some examples, the NOI indicator can instead by addressed to a multicast or broadcast address, for delivery to a plurality of other devices. In further examples, the NOI frame can also include a copy of the interfering frame detected at block 310.

Returning to FIG. 3, following transmission of the NOI indicator, at block 320 the assembly 212 is configured to await a response from the source of interference, and following receipt of the response, to select a corrective action to perform to reduce the future impact of interference from the source. Prior to discussing the selection of a corrective action at block 320, processing of the NOI indicator at the source of interference will be discussed in connection with FIG. 6.

Figure 6:
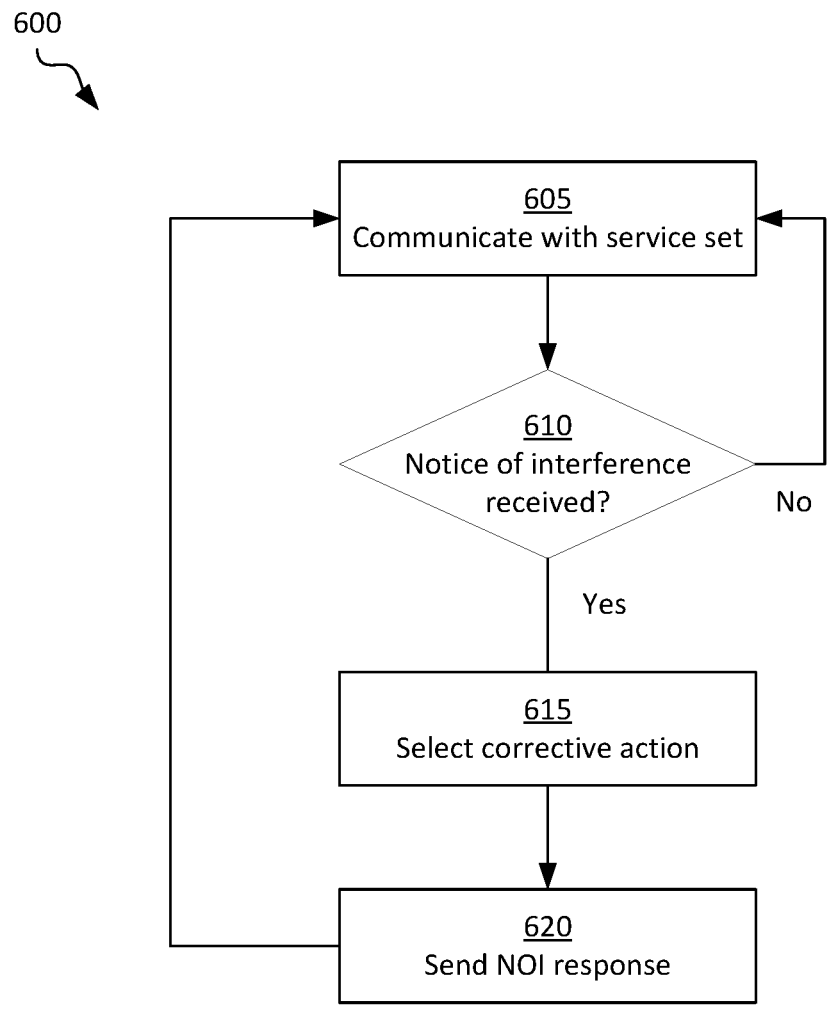
FIG. 6 depicts a method of spatial re-use in the system of FIG. 1.

Turning to FIG. 6, at block 605 the wireless communications assembly 212b (continuing with the example shown in FIG. 4 and discussed above, in which the device 116 is the source of interference detected by the device 104) is configured to establish data transfer communications within a second service set. Thus, when the assembly 212b performs the method 600, the assembly 212b is configured to establish a wireless communications link with a similar wireless communications assembly 212a of the device 112.

At block 610, the assembly 212b is configured to determine whether an NOI indicator has been received. When the determination is negative, communication within the second service set (i.e. with the device 112, in the present example) continues. When the determination is affirmative, however, performance of the method 600 proceeds to block 615. Thus, following receipt of the NOI frame 500 generated by the assembly 212 at block 315 of the method 300, the assembly 212b proceeds to block 615 of the method 600.

At block 605, the assembly 212b is configured to select a corrective action to perform in order to reduce or eliminate the interference indicated in the NOI indicator received at block 610. A variety of corrective actions are contemplated for selection at block 615. For example, the assembly 212b can be configured to select no corrective action; that is, to effectively ignore the NOI indicator. In other examples, the assembly 212b is configured to initiate a beamforming refinement procedure (BRP) with one or more other members of the second service set, with a view to restricting the physical width of the beams employed by those members (including the assembly 212b itself) to exchange data. In further examples, the corrective action can include initiating contention-based access rules (e.g. a "listen before talk" protocol) at the assembly 212b. In further examples, the corrective action includes appending TRN-R subfields to future frames, such as RTS and CTS frames generated by the assembly 212b. The corrective action can also include initiating a beamforming refinement procedure with the device from which the NOI indicator was received, to steer transmission nulls toward that device.

The selection of a corrective action can be based on one or more of the capabilities of the assembly 212b and the contents of the NOI indicator received at block 610. For example, the assembly 212b can be configured to select appending TRN-R fields to future RTS and CTS frames only if such appending was requested in the NOI indicator (e.g. by way of the request subfield 528 described above).

Having selected a corrective action, at block 620 the assembly 212b is configured to generate and send a response to the sender of the NOI indicator received at block 610. The response, in the present embodiment, is an NOI frame, such as an unprotected DMG Action frame. Turning to FIG. 7A, an NOI response frame 700 is illustrated. In addition to one or more addressing fields (not shown) containing a network address corresponding to the device 104 (i.e. the sender of the NOI indicator), the NOI response frame 700 also includes a plurality of fields, which are not necessarily illustrated to scale according to their lengths in bits. The fields include a category field 704, which is populated, for example, according to section 9.4.1.11 of the IEEE 802.11ad standard. The fields also include an action field 708 containing a value indicating the type of action represented by the NOI response frame 700. As will be apparent to those skilled in the art, certain values for the field 708 are specified in the 802.11ad standard (e.g. the value 0 corresponds to an "Announce" action and the value 1 corresponds to a beam refinement procedure (BRP) action). In the present example, the NOI response frame 700 contains a value (e.g. the value 2) in the field 708 that identifies the frame 700 as a notice of interference indication or response.

The frame 700 further includes a dialog token field 710, containing an identifier of the transaction initiated by the sending of the NOI response frame 700 and permitting subsequent messages relating to the NOI response frame 700 to be correlated with the frame 700. The dialog token field 712 may contain, in the present example, the same token value as the dialog token field 512 of the NOI frame 500 received from the device 104. Further, the frame 700 includes an NOI response field 716 containing one or more of the subfields illustrated in FIG. 7B.

In the present example, referring to FIG. 7B, the NOI response field 712 includes an address subfield 716, indicating one or both of a network address of the device 116 and a service set identifier of the second service set of which the device 116 is a member. A signal strength subfield 720 includes a measurement of the signal strength of the NOI indicator frame 500 as measured by the assembly 212b. The signal strength measurement can be indicated in one or both of an RSSI value (e.g. a value between 0 and 255) and a dBm value. The field 712 can also include an antenna weight vector subfield 724 indicating a set of complex weights currently employed by the assembly 212b to control the reception steering of the antenna array of the assembly 212b.

Further, the field 712 can include a corrective action identifier subfield 728 containing an identifier of the corrective action selected at block 615. For example, the subfield 728 can contain one or more numerical values, each predefined to correspond to a particular corrective action. In the present example, the value 1 corresponds to no corrective action (i.e. signaling an intention on the part of the assembly 212b to take no action responsive to the NOI indicator); the value 2 corresponds to an intention to append training sequences to subsequent RTS and CTS frames generated by the assembly 212b. Further, a value of 3 in the subfield 728 confirms that the assembly 212b will initiate the use of a contention-based access protocol (e.g. when requested by the assembly 212). A value of 4 in the subfield 728 indicates, in the present example, that the assembly 212b has initiated a sector sweep as part of a beamforming training procedure within the second service set. Further, a value of 5 in the subfield 728 indicates that the assembly 212b has initiated a BRP within the second service set (which typically follows the performance of a sector sweep). Having sent the response to the source of the NOI indicator, the assembly 212b is configured to initiate the corrective action selected at block 615, and to then return to block 605.

Returning to FIG. 3, the corrective action selected at block 320 by the assembly 212 can be based on the corrective action(s) identified in the subfield 728 of the NOI response received at block 320. For example, if the subfield 728 indicates that the source of the interference is initiated BRP, the assembly 212 can be configured at block 320 to also initiate beam refinement within the first service set (i.e. between the assembly 212 and the wireless communication assembly of the device 108). In other examples, the assembly 212 is configured to initiate beam forming refinement regardless of the content of the NOI response received at block 320. Other examples of corrective actions will also occur to those skilled in the art, including controlling the antenna array 220 to steer nulls in the direction of the assembly 212b, based on the weight vector subfield 724.

At block 325, the assembly 212 is configured to determine, after performance of the corrective action, whether continued interference is detected from the same source as at block 310. When the determination is negative (i.e. when the interference has been removed or reduced below predefined thresholds, e.g. by the corrective actions undertaken), the performance of the method 300 returns to block 305.

When the determination at block 325 is affirmative, the performance of the method 300 proceeds to block 330, at which the assembly 212 is configured to select a further corrective action. For example, the assembly 212 can be configured to initiate contention-based access rules at block 330 when other corrective actions (e.g. beamforming refinement) have failed to sufficiently reduce interference. The selection and performance of a further corrective action at block 330 may be performed without the transmission of an additional NOI indicator.

In some examples, the performance of blocks 325 and 330 may be omitted. Instead, following the selection and performance of a corrective action, the assembly 212 may simply return to block 305.

Variations to the above are contemplated. As will be apparent, each wireless communications assembly can both detect and cause interference. Thus, each assembly may, at any given time, perform one or both of methods 300 and 600 substantially simultaneously in connection with a variety of other wireless communications assemblies. In some examples, each assembly is configured, upon detecting interference, to determine whether it has recently (e.g. within a threshold time period) received an NOI indicator from the source of the interference; if so, the assembly is configured not to send an NOI indicator to the source of the interference, as doing so may be redundant.

In further examples, the assembly 212 is configured to maintain a log of NOI indicators sent and received, as well as NOI responses sent and received, including network addresses of the other assemblies involved and timestamps corresponding to the transmission or receipt of such NOI frames. With this data, the assembly 212 can be configured at block 310 to determine whether to act on interference based in part on the logged data. For example, if interference is detected from the device 116, but the logged data indicates that an NOI response was recently received (e.g. within the past 60 seconds) from the device 116 indicating that the device 116 would not undertake any corrective action, the assembly 212 may be configured to ignore the interference and return to block 305, until the threshold time period has expired. The threshold time period may also be applied irrespective of the previous response from the source of interference. Further, the threshold time period may be specified dynamically, for example as a number of beacon intervals (e.g. five).

In still further examples, the assembly is configured to send NOI indicators and await NOI responses from a single other device at any given time. Thus, when an NOI indicator has been sent at block 315, no further parallel performances of the method 300 are initiated, even when interference from a different device is detected.

Those skilled in the art will appreciate that in some embodiments, the functionality of the application 224 may be implemented using pre-programmed hardware or firmware elements (e.g., application specific integrated circuits (ASICs), field programmable gate arrays (FPGA)) or other related components.

The scope of the claims should not be limited by the embodiments set forth in the above examples, but should be given the broadest interpretation consistent with the description as a whole.

The invention claimed is:

1. A method for spatial re-use in a first client wireless communications assembly, comprising:
    establishing data transfer communications between the first client wireless communications assembly and a first access point, the first client wireless communications assembly and the first access point defining a first service set;
    detecting, at the first client wireless communications assembly, wireless interference generated by a second client wireless communications assembly via communication between the second client wireless communications assembly and a second access point, the second client wireless communications assembly and the second access point defining a second service set distinct from the first service set;
    responsive to the detecting, sending, from the first client wireless communications assembly to the second client wireless communications assembly, a notice of interference indicator containing a network address of the second client wireless communications assembly;
    receiving a response to the notice of interference indicator at the first client wireless communications assembly from the second client wireless communications assembly, the response addressed to the first wireless communications assembly;
    based on the response, selecting an interference-reducing corrective action to apply to communications between the first client wireless communications assembly and the first access point within the first service set; and
    initiating the selected corrective action within the first service set.

2. The method of claim 1, wherein detecting the wireless interference comprises detecting a transmission from the second client wireless communications assembly to the second access point, the transmission being addressed to a member of the second service set.

3. The method of claim 2, wherein sending the notice of interference indicator comprises extracting a network identifier of the second client wireless communications assembly from the transmission.

4. The method of claim 3, wherein sending the notice of interference indicator comprises generating a notice of interference frame including the network identifier of the second client wireless communications assembly.

5. The method of claim 1, further comprising:
    responsive to the detecting, and prior to sending the notice of interference indicator, measuring a signal strength of the interference;
    comparing the signal strength to a predefined threshold; and
    when the signal strength is below the predefined threshold, interrupting the sending.

6. The method of claim 1, wherein the notice of interference indicator includes a request to incorporate beamforming training fields to future transmissions from the second client wireless communications assembly.

7. The method of claim 1, wherein the notice of interference indicator includes a request to the second client wireless communications assembly to initiate a contention-based access protocol.

8. The method of claim 1, wherein the corrective action includes initiating a beamforming refinement procedure between the first client wireless communications assembly and the first access point.

9. A client wireless communications assembly, comprising:
    an antenna array; and
    a controller interconnected with the antenna array, the controller configured to:
        establish data transfer communications between the client wireless communications assembly and a first access point, the client wireless communications assembly and the first access point defining a first service set;
        detect wireless interference generated by a second client wireless communications assembly via communication between the second client wireless communications assembly and a second access point, the second client wireless communications assembly and the second access point defining a second service set distinct from the first service set;
        responsive to the detecting, send a notice of interference indicator addressed to the second client wireless communications assembly, the indicator containing a network address of the second client wireless communications assembly;
        receive a response to the notice of interference indicator from the second client wireless communications assembly, the response addressed to the client wireless communications assembly;

based on the response, select an interference-reducing corrective action to apply to communications between the client wireless communications assembly and the first access point within the first service set; and initiate the selected corrective action within the first service set.

10. The wireless communications assembly of claim 9, wherein detecting the wireless interference comprises detecting a transmission from the second client wireless communications assembly to the second access point, the transmission being addressed to a member of the second service set.

11. The wireless communications assembly of claim 10, wherein sending the notice of interference indicator comprises extracting a network identifier of the second client wireless communications assembly from the transmission.

12. The wireless communications assembly of claim 11, wherein sending the notice of interference indicator comprises generating a notice of interference frame including the network identifier of the second client wireless communications assembly.

13. The wireless communications assembly of claim 9, the controller further configured to:

responsive to the detecting, and prior to sending the notice of interference indicator, measure a signal strength of the interference;

compare the signal strength to a predefined threshold; and when the signal strength is below the predefined threshold, interrupt the sending.

14. The wireless communications assembly of claim 9, wherein the notice of interference indicator includes a request to incorporate beamforming training fields to future transmissions from the second client wireless communications assembly.

15. The wireless communications assembly of claim 9, wherein the notice of interference indicator includes a request to the second client wireless communications assembly to initiate a contention-based access protocol.

16. The wireless communications assembly of claim 9, wherein the corrective action includes initiating a beamforming refinement procedure between the client wireless communications assembly and the first access point.

* * * * *